United States Patent Office 3,403,177
Patented Sept. 24, 1968

3,403,177
PRETREATMENT OF CATALYST USED IN
THE PRODUCTION OF ACRYLIC ACID
AND ACROLEIN
Christopher John Brown, Walton-on-the-Hill, Tadworth,
England, assignor to The Distillers Company Limited,
Edinburgh, Scotland, a British company
No Drawing. Filed Nov. 22, 1965, Ser. No. 509,155
Claims priority, application Great Britain, Nov. 26, 1964,
48,035/64
5 Claims. (Cl. 260—533)

ABSTRACT OF THE DISCLOSURE

A catalyst of Sb, V and Sn and/or Fe used in the oxidation of propylene to acrylic acid and acrolein is heated to reaction temperature for at least one hour in an oxygen-free reducing atmosphere, in order to avoid undesirable temperature peaks in the catalyst bed.

---

The present invention relates to a process for the production of unsaturated aliphatic carboxylic acids and in particular to the production of acrylic acid.

My copending application Serial No. 427,502 describes a process for the production of acrylic acid with or without by-product acrolein by reaction of acrolein or compounds giving rise to acrolein under the reaction conditions, for example, propylene or allyl alcohol in the presence of molecular oxygen in the vapour phase at an elevated temperature over an oxide composition containing antimony, vanadium, with or without one or more additional polyvalent metals such as tin, titanium, chromium, manganese, iron, cobalt, nickel, copper, zinc, molybdenum, cadmium, tungsten or thorium as catalyst.

It has been found that of these catalysts those containing antimony, vanadium and at least one other polyvalent metal, for example, tin and/or iron have particular advantage in catalysing the production of acrylic acid together with by-product acrolein from a propylene feedstock. The reaction temperature in such a process varies within the range 250–500° C. It has been observed that on commencement or start-up of the process the catalyst is endangered because high temperature peaks develop in the bed and, a high content of the oxides of carbon is present in the reactor effluent. Avoidance of this condition has hitherto only been possible by ageing the catalyst at temperatures below 300° C., for example, of the order of 250° C., and thereafter gradually increasing the temperature over a long period, for example, 30–50 hours until optimum reaction temperatures are reached. Similar start-up difficulties also arise if the propylene feed is interrupted and the air/steam mixture passed over the catalyst for some time. Having regard to the conditions operating on a commercial plant such a method of start-up is impracticable.

It is an object of the present invention to overcome the above disadvantage and to provide a method of start-up of the process which avoids the necessity of a gradual build-up of temperature to a final optimum.

Accordingly the present invention is a process for the production of acrylic acid together with by-product acrolein which comprises the oxidation of propylene with molecular oxygen in the vapour phase at a temperature in the range 250–500° C. in the presence of an oxide composition containing antimony, vanadium, and a metal selected from the group consisting of tin or iron or mixtures as catalyst, characterised in that the catalyst is heated in an oxygen free reducing atmosphere to reaction temperature for a period of at least one hour before commencement of the oxidation reaction.

It has been found possible by operation in accordance with the above invention to obtain optimum yields of acrylic acid immediately on commencement of the oxidation process and without initial production of large amounts of the oxides of carbon in the reactor effluent.

The oxygen-free reducing atmosphere may be hydrogen or propylene starting material. Preferably the atmosphere comprises propylene and steam. The catalyst is heated in this atmosphere at reaction temperature, that is to say at temperatures subsequently to be used for the oxidation reaction for a period of at least one hour and preferably two hours before commencement of the oxidation. In operation, for example, the catalyst bed is contacted with a gaseous mixture containing propylene and steam and thereafter the oxygen is supplied together with, if necessary, an increased concentration of propylene for the oxidation reaction over the pretreated catalyst.

The catalyst used in the present process may be regarded as a mixture of antimony and vanadium oxides with the oxides of tin and/or iron or as oxygen containing compounds of antimony, vanadium and iron and/or tin; under the reaction conditions such a catalyst may contain either or both forms.

The catalyst may be prepared, for instance, by intimately mixing the oxides (or compounds yielding the oxides on decomposition) of antimony and vanadium with the oxides or compounds of iron and/or tin, or by co-hydrolysis of water soluble salts, for example, by the addition of ammonia to an aqueous solution of the chlorides. The iron and tin oxides or compounds may be added during or after the admixture of the antimony and vanadium oxides or compounds. Oxides of antimony which may be used in the manufacture of the catalyst include antimony trioxide, antimony tetroxide, antimony pentoxide or mixtures of these oxides. Suitable oxides of tin may be, for example, metastannic acid or stannic oxide.

The proportions of the various components of the catalyst may vary within moderately wide limits. Suitably the composition contains preferably a molar excess of antimony over any other single component and a molar ratio of antimony to vanadium between 1.8 and 3.5 is preferred.

By whichever method the catalyst is prepared its activity is frequently improved by a prior heat treatment, for instance, at a temperature between 550–1100° C., in a molecular oxygen containing gas.

The catalyst used in the process of the present invention may, if desired, be deposited on supports such as alumina, silica or titania.

The proportion of propylene in the feed during the oxidation reaction may vary within fairly wide limits, for example, between 1–20% by volume of the feed and suitably between 2–10% by volume.

The concentration of oxygen in the feed may also vary within moderately wide limits, for example, between 1–20% by volume and preferably between 2–15% by volume. The oxygen may be diluted with inert gases, for example, nitrogen, steam and may be, for example, supplied as air.

The acrylic acid may be recovered from the reaction products in any suitable manner, for example, by extraction with a solvent such as water.

The invention is illustrated by the following example:

Example

A mixture of propylene, 5% v./v.; steam, 35% v./v. and air, 60% v./v. was passed at 4 seconds contact time to a reactor packed with a catalyst consisting of the oxides of antimony, tin, vanadium and iron, and surrounded by heat-transfer salt at 332° C. A temperature peak rapidly developed (70° in 3 minutes) in the catalyst bed and the propylene feed was turned off (carbon oxides yield 30%).

The reactor was charged with fresh catalyst and a mixture of propylene (53 l./hr.) and steam (400 l./hr.) passed through at 315° C. for 45 minutes. Attempts to apply full feeds to the reactor caused an unstable temperature peak to develop due to insufficient reduction in catalyst activity. After a further 45 minute period of reduction with propylene and steam, full feeds were applied to the reactor at 320° C. (salt temperature) and a temperature peak of only 25° developed in the catalyst bed. Based on the propylene fed, the following yields were obtained, acrylic acid, 14.2%; acrolein, 45.2%; saturated acids, 2.3%; saturated carbonyls, 0.1%; carbon oxides, 8.3%.

I claim:

1. In a process for the production of acrylic acid together with by-product acrolein by the oxidation of propylene with molecular oxygen in the vapour phase at a temperature in the range 250–500° C. in the presence of an oxide composition containing antimony, vanadium and a metal selected from the group consisting of tin or iron or mixtures as catalyst, the improvement which comprises heating the catalyst in an oxygen-free reducing atmosphere to reaction temperature for a period of at least one hour before commencement of the oxidation reaction.

2. In a process as claimed in claim 1 wherein the reducing atmosphere comprises hydrogen.

3. In a process as claimed in claim 1 wherein the reducing atmosphere comprises propylene.

4. In a process as claimed in claim 3 wherein the reducing atmosphere comprises a mixture of propylene and steam.

5. In a process as claimed in claim 1 wherein the catalyst is heated in the reducing atmosphere for two hours before commencement of the oxidation reaction.

References Cited

UNITED STATES PATENTS 3,358,020  12/1967  Hendrickx.

HENRY R. JILES, *Primary Examiner.*

D. E. STENZEL, *Assistant Examiner.*